(12) United States Patent
Eggleton et al.

(10) Patent No.: US 11,092,033 B2
(45) Date of Patent: Aug. 17, 2021

(54) METHOD AND TOOLING FOR MANUFACTURING A FAN CASE ASSEMBLY

(71) Applicant: ROLLS-ROYCE PLC, London (GB)

(72) Inventors: Robert J. Eggleton, London (GB); Steven M. Hall, London (GB)

(73) Assignee: ROLLS-ROYCE PLC, London (GB)

( * ) Notice: Subject to any disclaimer, the term of this patent is extended or adjusted under 35 U.S.C. 154(b) by 14 days.

(21) Appl. No.: 16/502,728

(22) Filed: Jul. 3, 2019

(65) Prior Publication Data
US 2020/0011198 A1    Jan. 9, 2020

(30) Foreign Application Priority Data

Jul. 4, 2018 (GB) ..................................... 1811020

(51) Int. Cl.
*F01D 25/00* (2006.01)
*F01D 11/08* (2006.01)
*F01D 25/24* (2006.01)

(52) U.S. Cl.
CPC ............ *F01D 25/005* (2013.01); *F01D 11/08* (2013.01); *F01D 25/24* (2013.01); *F05D 2220/32* (2013.01); *F05D 2230/00* (2013.01)

(58) Field of Classification Search
CPC ........ F01D 11/08; F01D 25/005; F01D 25/24; F01D 25/246; F05D 2220/36; F05D 2220/32; F05D 2230/00; F05D 2230/60; Y02T 50/60
See application file for complete search history.

(56) References Cited

U.S. PATENT DOCUMENTS

| 3,542,152 | A | * | 11/1970 | Oxx, Jr. | .................... | B32B 3/12 |
| | | | | | | 181/214 |
| 2009/0226310 | A1 | * | 9/2009 | Finn | ...................... | F01D 21/045 |
| | | | | | | 415/200 |
| 2012/0082541 | A1 | * | 4/2012 | Macchia | ............... | F01D 21/045 |
| | | | | | | 415/200 |

(Continued)

FOREIGN PATENT DOCUMENTS

| EP | 3132918 A1 | 2/2017 |
| WO | 2015076882 A2 | 5/2015 |

OTHER PUBLICATIONS

Dec. 12, 2018—(UK) Search Report—App GB1811020 5.

*Primary Examiner* — Igor Kershteyn
(74) *Attorney, Agent, or Firm* — Banner & Witcoff, Ltd.

(57) ABSTRACT

A method of manufacturing a fan case assembly for a gas turbine engine, the fan case assembly comprising a fan case and a fan liner, wherein the method comprises: providing a mounting ring configured to extend about an inner circumference of the fan case; providing a gasket at an axial end of the mounting ring, wherein the gasket extends around the inner circumference of the fan case; providing the fan liner at the axial end of the mounting ring with the gasket, wherein the fan liner extends around the inner circumference of the fan case; and heating the fan case assembly so as to cure a resin provided between the fan case and fan liner, wherein the heating causes the mounting ring to expand radially relative to the fan case such that the gasket is brought into engagement with the fan case and unwanted migration of resin away from between the fan case and fan liner is restricted.

15 Claims, 7 Drawing Sheets

(56) References Cited

U.S. PATENT DOCUMENTS

| | | | |
|---|---|---|---|
| 2012/0099975 A1* | 4/2012 | Robertson, Jr. | F01D 21/045 415/182.1 |
| 2012/0148392 A1* | 6/2012 | Lussier | F01D 25/005 415/200 |
| 2012/0224949 A1* | 9/2012 | Harper | F02K 3/06 415/9 |
| 2013/0195605 A1* | 8/2013 | Robertson | F01D 11/18 415/1 |
| 2016/0201505 A1* | 7/2016 | Clarkson | F01D 25/243 415/200 |
| 2017/0044934 A1* | 2/2017 | Hicklin | B29C 65/4835 |

* cited by examiner

Fig. 9

METHOD AND TOOLING FOR MANUFACTURING A FAN CASE ASSEMBLY

CROSS-REFERENCE TO RELATED APPLICATION

This application claims priority to and the benefit of United Kingdom Patent Application No. 1811020.5, filed Jul. 4, 2018, which prior application is incorporated herein by reference in its entirety.

TECHNICAL FIELD

The present disclosure relates to a method and tooling for manufacturing a fan case assembly and particularly although not exclusively relates to the provision of a gasket to prevent the migration of resin from between a fan case and fan liner during a curing process.

BACKGROUND

Conventional fans used in jet engines are surrounded by a casing. These casings are usually fitted with liners such as impact liners or acoustic liners which are designed to reduce noise propagation to the surrounding area. Liners are typically bonded to the casing using a resin. However, the bonding process typically results in leakage of resin, which can collect on regions of the casing at edges of the liner. Often, this requires the manual removal of resin.

SUMMARY

According to a first aspect there is provided a method of manufacturing a fan case assembly for a gas turbine engine, the fan case assembly comprising a fan case and a fan liner, wherein the method comprises: providing a mounting ring configured to extend about an inner circumference of the fan case; providing a gasket at an axial end of the mounting ring, wherein the gasket extends around the inner circumference of the fan case; providing the fan liner at the axial end of the mounting ring with the gasket, wherein the fan liner extends around the inner circumference of the fan case; and heating the fan case assembly so as to cure a resin provided between the fan case and fan liner, wherein the heating causes the mounting ring to expand radially relative to the fan case such that the gasket is brought into engagement with the fan case and unwanted migration of resin away from between the fan case and fan liner is restricted.

The gasket may be spaced apart from the fan case prior to the heating of the fan case assembly.

The method may further comprise separating the fan case assembly from the mounting ring and gasket.

A first end of the fan liner may be provided at the axial end of the mounting ring. The method may further comprise providing a further gasket at a second end of the fan liner opposite the first end of the fan liner, the further gasket being configured to restrict unwanted migration of resin away from between the fan case and fan liner at the second end of the fan liner.

The axial end of the mounting ring may comprise a notch for receiving the gasket.

The notch may have an axial depth less than a corresponding thickness of the gasket such that the gasket sits proud of the notch in an axial direction, of the fan case assembly. The gasket may sit proud of the notch by approximately 0.1 mm in the axial direction.

The notch may have a radial depth less than a corresponding thickness of the gasket such that the gasket sits proud of the notch in a radial direction.

The gasket may be made from a fully cured silicone material. The gasket may have a Shore hardness of approximately 40.

The mounting ring may be made from a material with a thermal expansion rate greater than that of the fan case.

According to a second aspect there is provided a tool assembly for manufacturing a fan case assembly for a gas turbine engine, the fan case assembly comprising a fan case and a fan liner, wherein the tool assembly comprises: a mounting ring configured to extend about an inner circumference of the fan case; a gasket providable at an axial end of the mounting ring with the gasket extending around the inner circumference of the fan case; wherein the mounting ring is configured such that the fan liner is providable at the axial end of the mounting ring with the fan liner extending around the inner circumference of the fan case; and wherein the mounting ring and gasket are configured such that heating the fan case assembly to cure a resin provided between the fan case and fan liner causes the mounting ring to expand radially relative to the fan case such that the gasket is brought into engagement with the fan case and unwanted migration of resin away from between the fan case and fan liner is restricted.

The gasket may be spaced apart from the fan case prior to the heating of the fan case assembly.

The axial end of the mounting ring may comprise a notch for receiving the gasket.

The notch may have an axial depth less than a corresponding thickness of the gasket such that the gasket sits proud of the notch in an axial direction of the fan case assembly. The gasket may sit proud of the notch by approximately 0.1 mm.

The notch may have a radial depth less than a corresponding thickness of the gasket such that the gasket sits proud of the notch in a radial direction.

The gasket may be made from a fully cured silicone material. The gasket may have a Shore hardness of approximately 40.

The mounting ring may be made from a material with a thermal expansion rate greater than that of the fan case.

The mounting ring may be made from Aluminum. The fan case may be made from carbon fibre.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg$^{-1}$s, 105 Nkg$^{-1}$s, 100 Nkg$^{-1}$s, 95 Nkg$^{-1}$s, 90 Nkg$^{-1}$s, 85 Nkg$^{-1}$s or 80 Nkg$^{-1}$s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminum based material (such as an aluminum-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminum based body (such as an aluminum lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Figure 1:
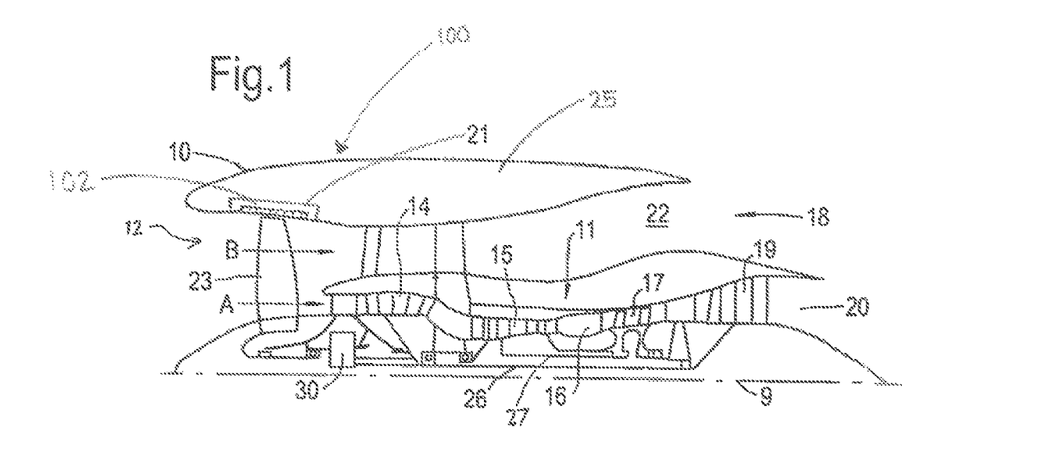
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 25 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30. A fan case 21 surrounds the fan 23.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
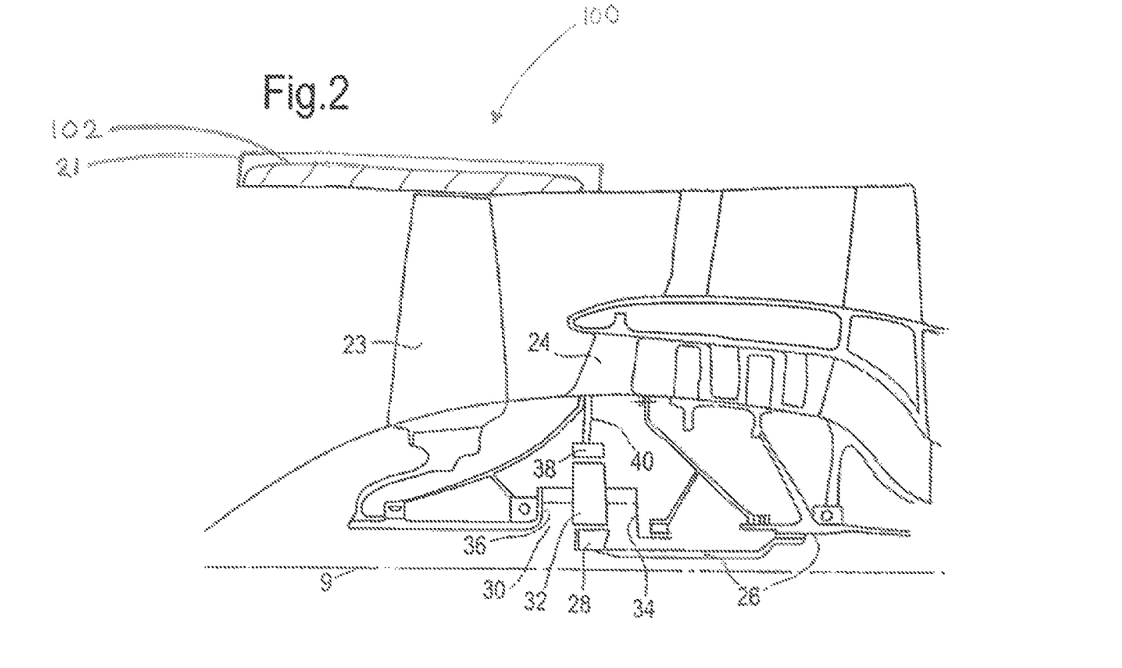
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
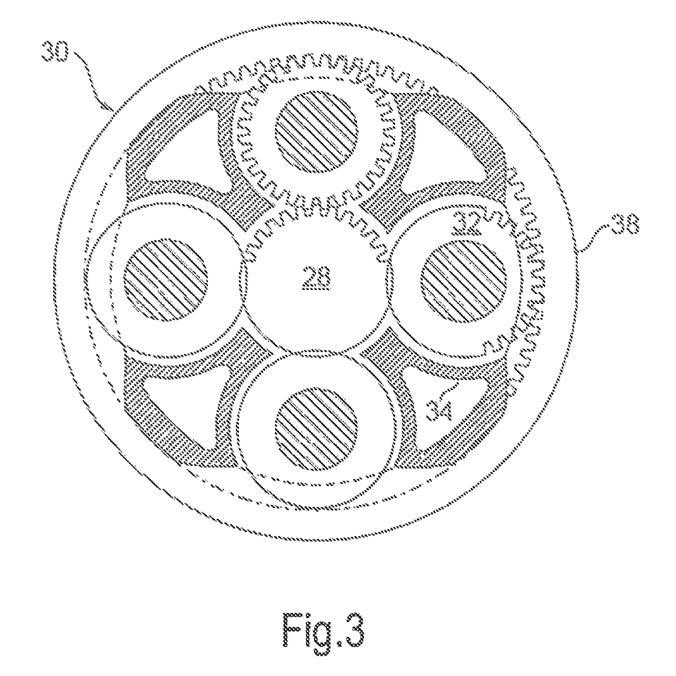
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

With reference to FIGS. 1 and 2, the fan case 21 is provided in a fan case assembly 100, which also comprises a fan liner 102. The fan liner 102 is arranged on the radially inner surface of the fan case 21.

Figure 4:
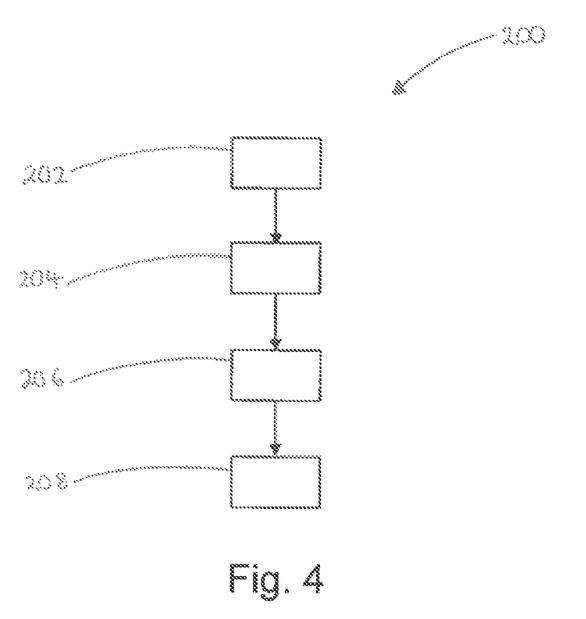
FIG. 4 is a flowchart of a method of manufacturing a fan case assembly.

FIG. 4 depicts a method 200 of manufacturing the fan case assembly 100. A tool assembly 300 (as depicted in FIGS. 5 to 9) may be used to manufacture the fan case assembly 100. The tool assembly 300 comprises a mounting ring 302 and a seal or gasket 304. The mounting ring 302, the gasket 304, the fan case 21 and fan liner 102 are concentrically arranged. The tool assembly 300 may further comprise a base 306 which may receive the fan case 21 and mounting ring 302.

In FIGS. 5 to 9, the axis 9 has been rotated by 90 degrees relative to the orientation depicted in FIG. 1.

Figure 5:
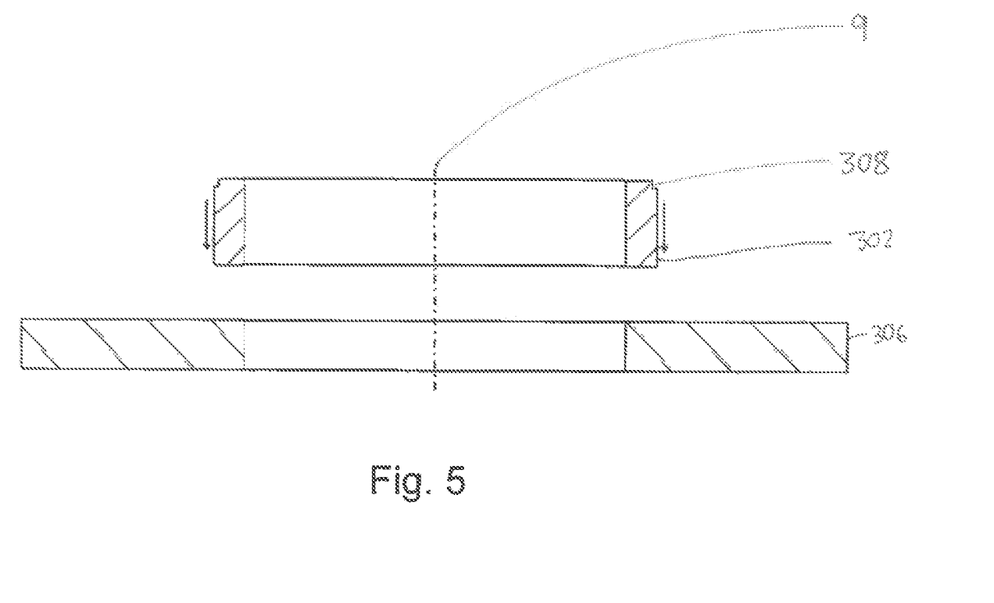
FIG. 5 is a schematic side view of part of a tool assembly before being placed on a base.

The method 200 begins with step 202 in which the mounting ring 302 is provided as depicted in FIG. 5. The mounting ring 302 may optionally be secured to the base 306. The mounting ring 302 is configured to extend about an inner circumference of the fan case 21 once it is in place.

Figure 6:
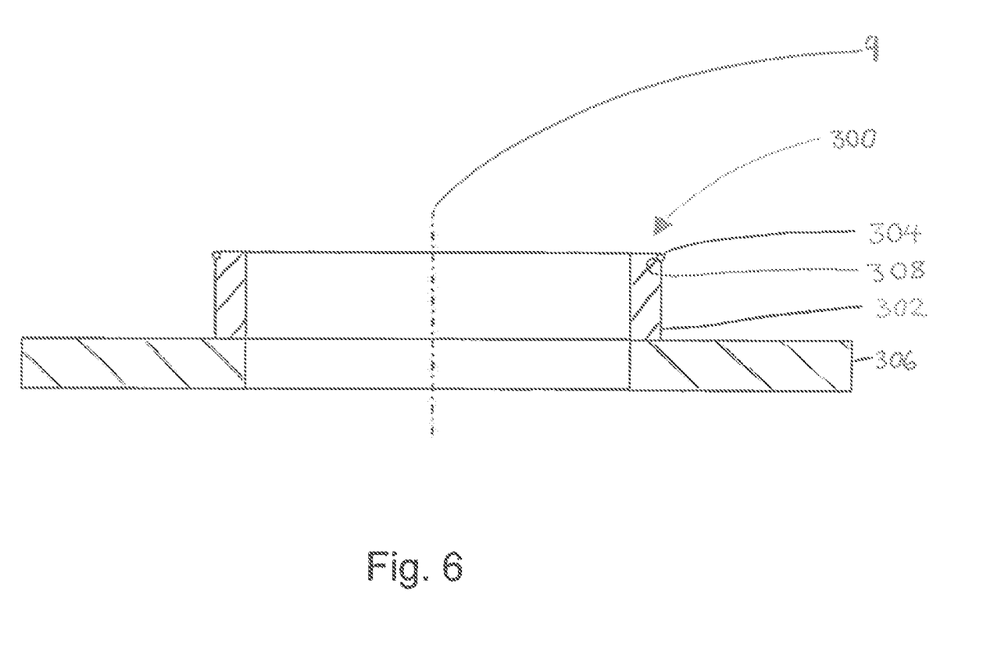
FIG. 6 is a sectional side view of the tool assembly on the base.
Figure 7:
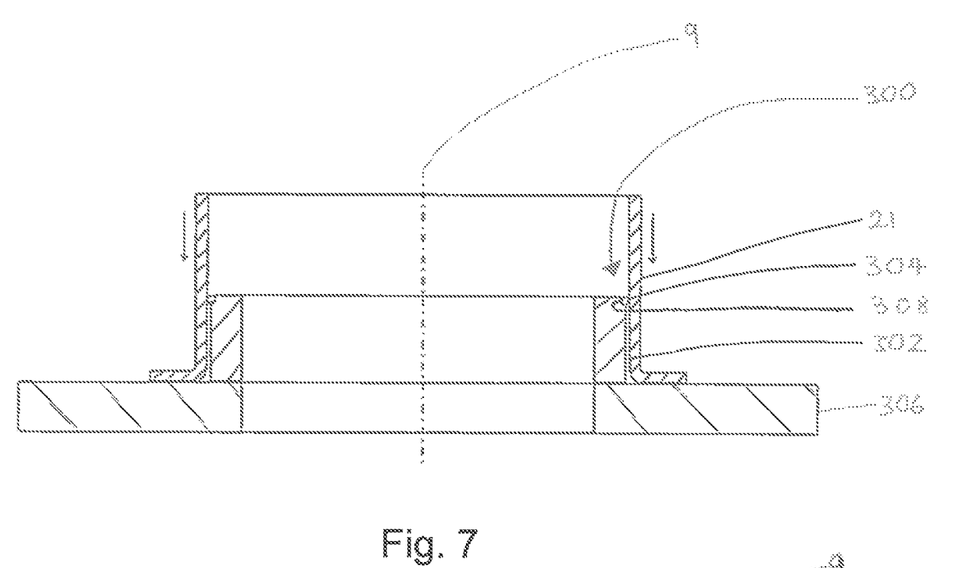
FIG. 7 is a sectional side view of the arrangement provided in FIG. 6, fitted with a fan case, only a part of which is illustrated.

At step 204, the gasket 304 is provided at an axial end of the mounting ring 302 as depicted in FIG. 6. The fan case 21 is then placed around the mounting ring 302 as depicted in FIG. 7. In alternative methods, the fan case 21 may be placed around the mounting ring before the gasket is in place. In either case, the gasket 304 extends around the inner circumference of the fan case 21. The outer diameter of the mounting ring 302 is smaller than the inner diameter of the fan case 21. Therefore a clearance is provided between the mounting ring 302 and the fan case 21. The clearance enables the fan case 21 to be easily placed over the mounting ring 302.

The outer diameter of the gasket 304 (e.g. the distance from a centre of the tool assembly 300 to the radially outermost point of the gasket 304) is also smaller than the inner diameter of the fan case 21. Therefore a clearance is provided between the gasket 304 and the fan case 21. The clearance enables the fan case 21 to be easily placed over gasket 304.

Figure 8:
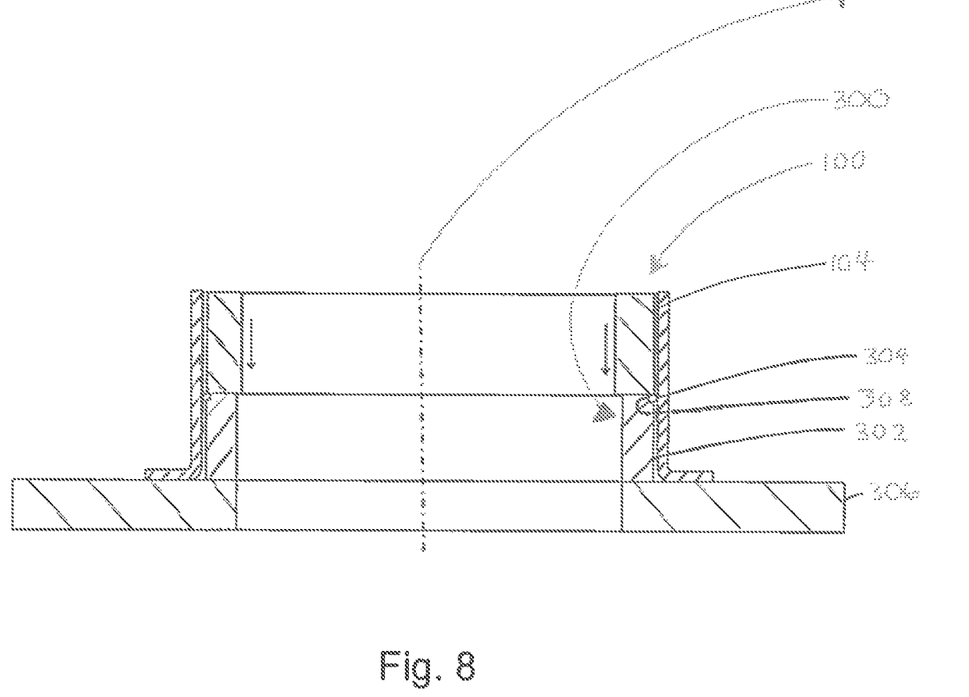
FIG. 8 is a sectional side view of the arrangement provided in FIG. 7, fitted with a fan liner, only a part of which is illustrated.

At step 206, the fan liner 102 is provided at the axial end of the mounting ring 302 at which the gasket 304 is disposed, as depicted in FIG. 8. The fan liner 102 extends around the inner circumference of the fan case 21. The fan liner 102 is configured to rest on the mounting ring 302 such that the gasket 304 is compressed by the fan liner 102 when it is mounted onto the mounting ring 302. This compression may cause a radial expansion of the gasket 304, such that the clearance between the gasket 304 and the fan liner 102 reduces. However, in the arrangement best depicted in FIGS. 10a to 10c, the radial expansion resulting from the axial compression of the gasket 304 may not be enough to bring the gasket 304 into contact with the fan case 21.

At step 208, the fan case assembly 100 is heated so as to cure a resin 104 provided between the fan case 21 and fan liner 102. The heating of the fan case assembly 100 causes the mounting ring 302 to expand radially relative to the fan case 21 such that the gasket 304 is brought into engagement with the fan case 21 (as depicted in FIG. 10c) and unwanted migration of resin 104 away from between the fan case 21 and fan liner 102 is restricted.

In some arrangements, step 208 may be performed in a vacuum. The tool assembly 300 and fan case assembly 100 may be disposed inside a vacuum vessel or bag during the curing process.

The composition of the mounting ring 302 may be configured to enable the rate of thermal expansion of the mounting ring 302 to exceed the rate of thermal expansion of the fan case 21. A differential radial thermal expansion between the mounting ring 302 and the fan case 21 may enable the clearance between the mounting ring 302 and the fan case 21 to be reduced upon heating. As the mounting ring 302 expands, it exerts a radial force on the gasket 304, thereby enlarging the radius of the gasket 304. This enlargement brings the gasket 304 into contact with the fan case 21 such that a seal is formed between the gasket 304 and the fan case 21. The seal prevents the passage of resin 104 between the fan case 21 and the mounting ring 302.

The fan case 21 may be made of any material such as carbon fibre or other fibre-composite materials. This may undergo little or no thermal expansion during curing. The mounting ring 302 may be made of a material such as aluminum. The gasket 304 may be made of a material such as fully cured silicone or other silicon-based materials and may be formed by extrusion. The gasket 304 may be reusable. The gasket may have a Shore hardness of approximately 40.

Figure 9:
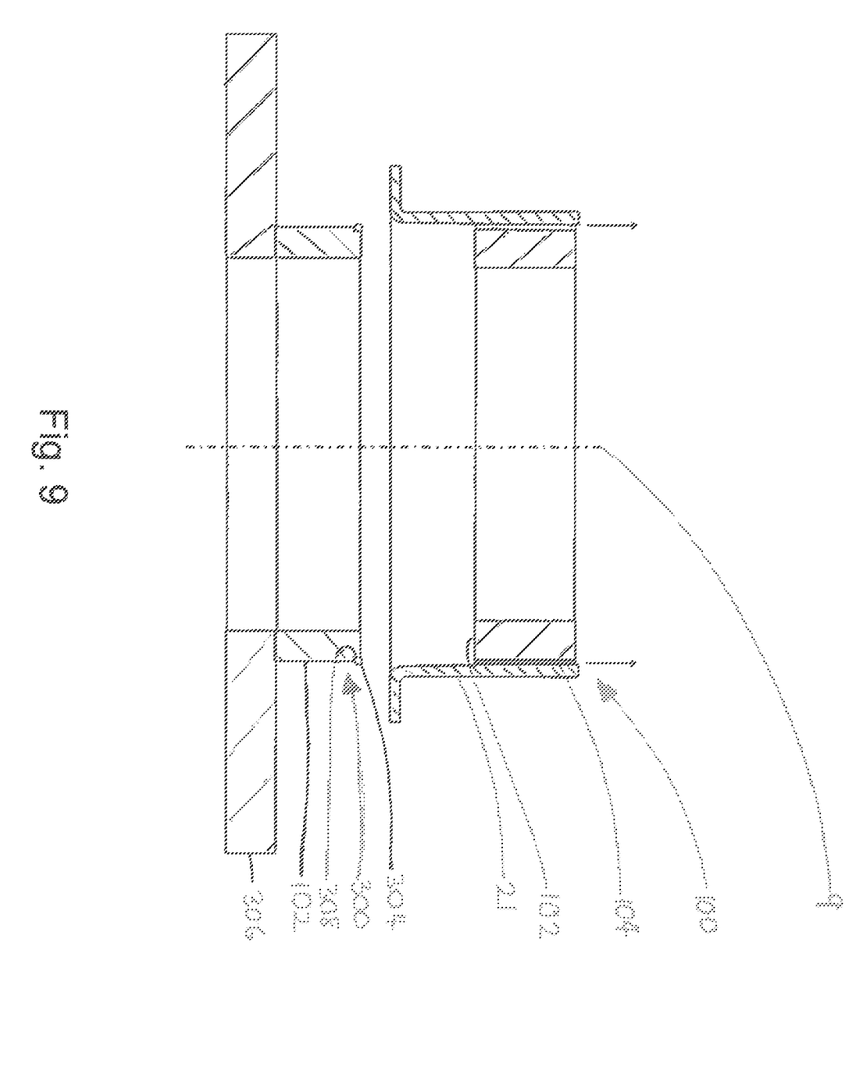
FIG. 9 is a sectional side view of the fan case assembly being removed from the fan liner.

After the resin 104 has been cured, the temperature of the mounting ring 302 is reduced, causing thermal contraction. The thermal contraction of the mounting ring 302 causes a decrease in diameter, which increases the clearance between the mounting ring 302 and the fan case 21. Since the thermal contraction of the mounting ring 302 results in a reduction of the outward radial force exerted on the gasket 304, the outer diameter of the gasket 304 decreases such that the outer surface of the gasket 304 retracts from contact with the fan case 21. This retraction breaks the seal between the gasket 304 and the fan case 21 and forms a clearance which facilitates the removal of the fan case assembly 100 from the tool assembly apparatus, as depicted in FIG. 9.

Although the gasket 304 is depicted to have a substantially circular cross-section, it is envisaged that the gasket 304 may have any cross-section which enables a seal to be formed between the gasket 304 and the fan case 21 during step 208, described above.

The axial end of the mounting ring 302 may comprise a notch 308 for receiving the gasket 304. In the illustrated arrangement, the notch is a recess in a corner of the annular mounting ring 302, with a rectangular cross-section. However it is envisaged that the notch 308 may be any recess or retaining protrusion configured to axially and radially maintain the gasket 304 in a position concentric with the mounting ring 302. The notch 308 may be disposed at an outer radial end of the mounting ring 302 which is adjacent to the fan case 21.

Figure 10A:
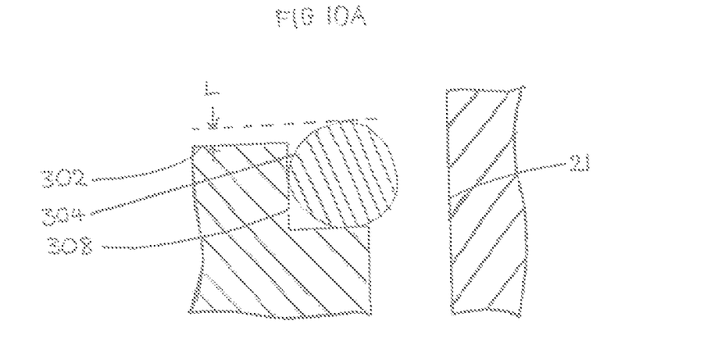
FIGS. 10a to 10c are partial sectional side views of components of the fan case assembly and tooling assembly during the method shown in FIG. 4.
Figure 10B:
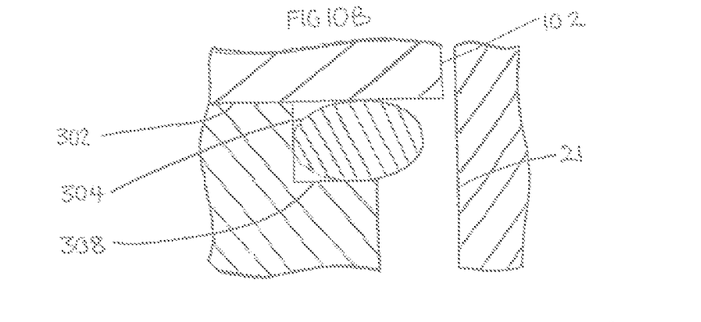
Figure 10C:
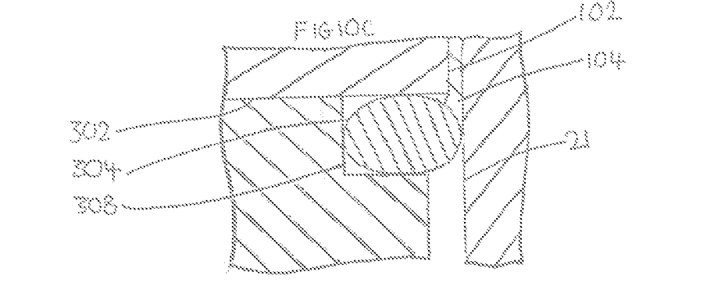

The notch 308 may have an axial depth less than a corresponding thickness of the gasket 304 such that the gasket 304 sits proud of the notch 308 in an axial direction prior to the fan liner 102 being placed on the mounting ring 302, as depicted in FIG. 10a. The gasket 304 may sit proud of the notch 308 by a distance that is sufficiently small so as to enable the gasket 304 to be compressed when the fan liner 102 is placed on the mounting ring 302, whilst maintaining at least some clearance between the gasket 304 and the fan case 21, as shown in FIG. 10b. For, example, the gasket 304 may initially sit proud of the notch 308 by a distance L, which may be approximately 0.1 mm in the axial direction.

The notch 308 may have a radial depth less than a corresponding radial thickness of the gasket 304 such that the gasket 304 sits proud of the notch 308 in a radial direction, as depicted in FIG. 10a. Alternatively, the radial depth of the notch 308 may be equal to or greater than the initial radial thickness of the gasket 304 and the axial compression of the gasket 304 by the fan liner 102 may cause the gasket 304 to sit proud of the notch 308 in the radial direction.

FIG. 10c depicts the gasket 304 during the curing process in which the mounting ring 302 has expanded towards the fan case 21 and the gasket 308 has engaged the fan case 21. Migration of the resin 104 away from between the fan case 21 and the fan liner 102 has thus been restricted.

A second gasket (not shown) may be provided at the other axial end of the fan liner 102. The second gasket may be configured to prevent resin 104 from being expelled from between the fan liner 102 and the fan case 21. The second gasket may be annular and may be triangular in cross-section. The fan liner 102 may be configured to axially retain the second gasket. The second gasket may have an outer diameter that is substantially equal to the inner diameter of the fan case 21 such that a seal is maintained between the second gasket and the fan case 21 before and/or during curing.

The leakage of resin can require laborious removal after the curing process is complete. The removal of resin can increase the risk of damage to the fan case 21 and/or fan lining 102 during manufacture. Therefore, the provision of a barrier to the spewing of resin 104 beyond the gasket 304 can reduce the time required to manufacture the fan case assembly 100.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of manufacturing a fan case assembly for a gas turbine engine, the fan case assembly comprising a fan case and a fan liner, wherein the method comprises:
   providing a mounting ring configured to extend about an inner circumference of the fan case;
   providing a gasket at an axial end of the mounting ring, wherein the gasket extends around the inner circumference of the fan case;
   providing the fan liner at the axial end of the mounting ring with the gasket, wherein the fan liner extends around the inner circumference of the fan case; and
   heating the fan case assembly so as to cure a resin provided between the fan case and the fan liner, wherein the heating causes the mounting ring to expand radially relative to the fan case such that the gasket is brought into engagement with the fan case and unwanted migration of resin away from between the fan case and the fan liner is restricted.

2. The method of claim 1, wherein a first end of the fan liner is provided at the axial end of the mounting ring, and wherein the method further comprises:
   providing a further gasket at a second end of the fan liner opposite the first end of the fan liner, the further gasket being configured to restrict unwanted migration of resin away from between the fan case and the fan liner at the second end of the fan liner.

3. The method of claim 1, wherein the axial end of the mounting ring comprises a notch for receiving the gasket.

4. The method of claim 3, wherein the notch has an axial depth less than a corresponding thickness of the gasket such that the gasket sits proud of the notch in an axial direction.

5. The method of claim 3, wherein the notch has a radial depth less than a corresponding thickness of the gasket such that the gasket sits proud of the notch in a radial direction.

6. The method of claim 1, wherein the gasket is made from a fully cured silicone material.

7. The method of claim 1, wherein the gasket has a Shore hardness of approximately 40.

8. The method of claim 1, wherein the mounting ring is made from a material that expands at a greater rate than the fan case.

9. A tool assembly for manufacturing a fan case assembly for a gas turbine engine, the fan case assembly comprising a fan case and a fan liner, wherein the tool assembly comprises:
   a mounting ring configured to extend about an inner circumference of the fan case;
   a gasket providable at an axial end of the mounting ring with the gasket extending around the inner circumference of the fan case;
   wherein the mounting ring is configured such that the fan liner is providable at the axial end of the mounting ring with the fan liner extending around the inner circumference of the fan case; and
   wherein the mounting ring and gasket are configured such that heating the fan case assembly to cure a resin provided between the fan case and fan liner causes the mounting ring to expand radially relative to the fan case such that the gasket is brought into engagement with the fan case and unwanted migration of resin away from between the fan case and the fan liner is restricted.

10. The tool assembly of claim 9, wherein the axial end of the mounting ring comprises a notch for receiving the gasket.

11. The tool assembly of claim 10, wherein the notch has an axial depth less than a corresponding thickness of the gasket such that the gasket sits proud of the notch in an axial direction.

12. The tool assembly of claim 10, wherein the notch has a radial depth less than a corresponding thickness of the gasket such that the gasket sits proud of the notch in a radial direction.

13. The tool assembly of claim 9, wherein the gasket is made from a fully cured silicone material.

14. The tool assembly of claim 9, wherein the gasket has a Shore hardness of approximately 40.

15. The tool assembly of claim 9, wherein the mounting ring is made from a material with a thermal expansion rate greater than the fan case.

* * * * *